United States Patent
Koos, Jr. et al.

(10) Patent No.: US 6,925,069 B2
(45) Date of Patent: Aug. 2, 2005

(54) DATA NETWORK HAVING A WIRELESS LOCAL AREA NETWORK WITH A PACKET HOPPING WIRELESS BACKBONE

(75) Inventors: William M. Koos, Jr., Altamonte Springs, FL (US); Larry W. Koos, Sanford, FL (US)

(73) Assignee: MeshNetworks, Inc., Maitland, FL (US)

( * ) Notice: Subject to any disclaimer, the term of this patent is extended or adjusted under 35 U.S.C. 154(b) by 132 days.

(21) Appl. No.: 10/126,708

(22) Filed: Apr. 19, 2002

(65) Prior Publication Data

US 2003/0198208 A1 Oct. 23, 2003

(51) Int. Cl.[7] .......................... H04Q 7/00; H04L 12/28; H04L 12/56
(52) U.S. Cl. .................. 370/334; 370/392; 370/401
(58) Field of Search ............................. 370/310–310.2, 370/315, 329, 334, 313, 339, 351–356, 389, 392, 401, 465–466, 328, 338, 352

(56) References Cited

U.S. PATENT DOCUMENTS

| | | | |
|---|---|---|---|
| 5,436,905 A | | 7/1995 | Li et al. |
| 5,490,139 A | | 2/1996 | Baker et al. |
| 5,726,644 A | | 3/1998 | Jednacz et al. |
| 5,737,318 A | | 4/1998 | Melnik |
| 5,784,539 A | | 7/1998 | Lenz |
| 5,875,179 A | | 2/1999 | Tikalsky |
| 5,898,733 A | | 4/1999 | Satyanarayana |
| 5,909,429 A | | 6/1999 | Satyanarayana et al. |
| 5,926,101 A | | 7/1999 | Dasgupta |
| 5,946,631 A | * | 8/1999 | Melnik ..................... 455/522 |
| 5,978,364 A | | 11/1999 | Melnik |
| 6,028,857 A | * | 2/2000 | Poor ........................... 370/351 |
| 6,046,978 A | | 4/2000 | Melnik |
| 6,104,712 A | | 8/2000 | Robert et al. |
| 6,223,054 B1 | | 4/2001 | Katko |
| 6,236,649 B1 | | 5/2001 | Jun |
| 6,301,239 B1 | | 10/2001 | Chuprun et al. |
| 6,307,837 B1 | | 10/2001 | Ichikawa et al. |
| 6,327,245 B1 | | 12/2001 | Satyanarayana et al. |
| 6,452,910 B1 | * | 9/2002 | Vij et al. ..................... 370/310 |
| 6,469,992 B1 | | 10/2002 | Schieder |
| 6,516,065 B1 | * | 2/2003 | Joshi et al. ................. 380/270 |
| 6,560,448 B1 | | 5/2003 | Baldwin et al. |
| 6,580,925 B2 | * | 6/2003 | Ma et al. .................... 455/560 |
| 6,583,806 B2 | * | 6/2003 | Ludwig et al. .......... 348/14.08 |
| 6,601,084 B1 | | 7/2003 | Bhaskaran et al. |
| 6,751,732 B2 | * | 6/2004 | Strobel et al. .............. 713/176 |
| 6,760,601 B1 | * | 7/2004 | Suoknuuti et al. .......... 455/557 |
| 2002/0035699 A1 | | 3/2002 | Crosbie |
| 2002/0073240 A1 | * | 6/2002 | Kokkinen et al. .......... 709/249 |
| 2002/0085503 A1 | * | 7/2002 | Hulyalkar et al. .......... 370/329 |
| 2002/0118663 A1 | * | 8/2002 | Dorenbosch et al. ....... 370/338 |
| 2002/0132603 A1 | * | 9/2002 | Lindskog et al. ........... 455/343 |
| 2003/0018774 A1 | * | 1/2003 | Flinck et al. ................ 709/223 |
| 2003/0061344 A1 | | 3/2003 | Monroe |
| 2003/0076837 A1 | * | 4/2003 | Whitehill et al. ......... 370/395.4 |
| 2003/0092465 A1 | * | 5/2003 | Darabi et al. ............... 455/552 |
| 2003/0156558 A1 | * | 8/2003 | Cromer et al. ............. 370/331 |
| 2003/0179750 A1 | * | 9/2003 | Hasty et al. ................ 370/390 |
| 2003/0184492 A1 | * | 10/2003 | Chiang et al. .............. 343/833 |
| 2004/0095888 A1 | * | 5/2004 | Noel, JR. .................... 370/238 |

\* cited by examiner

Primary Examiner—Chi Pham
Assistant Examiner—Ronald Abelson
(74) Attorney, Agent, or Firm—Gardner Carton & Douglas, LLP; Joseph J. Buczynski

(57) ABSTRACT

A wireless local area network (LAN) for data communications. The wireless LAN includes a packet hopping access terminal (PHAST) and a packet hopping gateway (PHG). The PHAST has a first transceiver for wirelessly communicating with a client device, and a second transceiver for wirelessly receiving data packets addressed to the client device and for wirelessly transmitting data packets received from the client device in accordance with a packet hopping protocol. The PHG has a transceiver for wirelessly receiving the data packets transmitted by the PHAST and for transmitting the data packets addressed to the client device in accordance with the packet hopping protocol, and a network interface for establishing communication with a server.

126 Claims, 5 Drawing Sheets

DATA NETWORK HAVING A WIRELESS LOCAL AREA NETWORK WITH A PACKET HOPPING WIRELESS BACKBONE

TECHNICAL FIELD

The present invention relates generally to the field of computer networking and, more particularly, to a wireless, packet hopping network that includes access points that wirelessly communicate with a gateway.

BACKGROUND

A pervasive trend in modern computing is to network multiple computing devices to one another so that the computing devices can share data in an electronic format. Computing devices that can be networked include, for example, fixed location computers (e.g., desktop computers and workstations), portable computers (e.g., laptop or notebook computers and personal digital assistants (PDAs)), input/output (I/O) devices (e.g., printers, scanners, and digital senders). However, the networked devices can also include devices that exchange voice data (e.g., mobile telephones or handheld radios).

Another trend in the networking of computing devices is to provide wireless data exchange between a client device and an access point. Multiple access points can be networked together to form a wireless local area network (WLAN). More specifically, the access points (also referred to as wireless access points, or WAPs) communicate via a hard wired infrastructure using a series of hubs and/or switches that are interconnected to form a local area network (LAN). Various servers (e.g., a web server, an e-mail server, a print server, a database server, a file server, and so forth) can be coupled to the LAN via one or more of the hubs and/or switches.

With reference to FIG. 1, a typical conventional network 10 that includes wireless communication to one or more client computing devices 12 is illustrated. The client computing devices 12 are provided with a communications protocol that can be executed by a processor of the computing device 12 and/or by dedicated communications hardware (e.g., a transceiver) coupled to the client computing device 12. The communications hardware can include an antenna 14. The antennas 14 exchange signals with the WAPs 16. The WAPs 16 execute a communications protocol corresponding to the communication protocol executed by the client devices 12. The WAPs 16 also include communications hardware (e.g., a transceiver with an antenna 18) for broadcasting signals to the client devices 12 and receiving signals broadcast by the client devices 12.

Each WAP 16 is placed in communication with a switch or, as illustrated, a hub 20 via a physical hard wired connection 22. Each hub 20 is hard wired to at least one other hub 20 via a physical wired connection 24. For example, the hubs 20 can be arranged in a hierarchical structure, a token ring configuration and so forth. It is noted that the hard wired connections 22 and 24 can be electrically conductive wires (e.g., twisted pair or coaxial cable) or can be another conductor medium (e.g., fiber optic cable). The hubs 20, the WAPs 16 and the hardwired connections 22 and 24 make up a wired LAN 30.

Various servers 26 and/or a network manager terminal 28 can be coupled to the wired LAN 30 via one or more of the hubs 20. The wired LAN 30 can also be coupled to an external, or public network 32 (e.g., the Internet) via a firewall 34. The firewall 34 provides information technology security between the external network 32 and the wired LAN 30.

Although the conventional network 10 illustrated in FIG. 1 is effective for exchanging data packets between the client computing devices 12 and the servers 26, the conventional network 10 has at least two disadvantages. First, the hard wired connections 22 and 24 are difficult, time consuming and expensive to install. In a hard wired network, cables must be strung throughout a facility (e.g., a building). Wiring the network can include passing wires through walls, floors, above suspended ceilings panels, below raised floor panels, and so forth. Such installation work can prove difficult during construction of a new building and even more difficult in an existing building, especially in existing buildings that were built before computer networks were considered in the architectural plan.

A second disadvantage of the conventional network 10 is that information security of the conventional network 10 can be compromised if an unscrupulous user of a client device 12 establishes communication with one of the WAPs 16. Such a client device 12 would be located on the local side of the firewall 34 and, assuming that the client device 12 has obtained proper authentication, can access various other devices on the local side of the firewall 34, including the servers 26.

Accordingly, there exists a need in the art for a communications network that reduces its reliance on hard wired connections and has enhanced security.

SUMMARY OF THE INVENTION

According to one aspect of the invention, the invention is a wireless local area network (LAN) for data communications. The wireless LAN includes a packet hopping access terminal and a packet hopping gateway. The packet hopping access terminal has a first transceiver for wirelessly transmitting data packets addressed to a client device and for wirelessly receiving data packets from the client device, and a second transceiver for wirelessly receiving the data packets addressed to the client device and for wirelessly transmitting the data packets received from the client device in accordance with a packet hopping protocol, the packet hopping protocol including a data packet router/repeater function. The packet hopping gateway has a third transceiver for wirelessly receiving the data packets transmitted by the packet hopping access terminal and for wirelessly transmitting the data packets addressed to the client device in accordance with the packet hopping protocol, and a network interface for establishing communication with a server.

According to another aspect of the invention, the invention is a data communications network. The data communications network includes a packet hopping gateway (PHG) and at least one packet hopping access terminal (PHAST). The PHG includes a network interface for establishing communication with a server via a wide area network backbone and a transceiver for wirelessly receiving data packets originating from a client device and addressed to the server and wirelessly transmitting data packets originating from the server and addressed to the client device in accordance with a packet hopping protocol. The PHG is operatively arranged to dynamically configure a virtual private network between a firewall and the client device as the client device initiates communication with the data communications network, the firewall disposed between the wide area network backbone and the server. The at least one PHAST includes at least one transceiver operative arranged to act as an intermediate transmission node for the data packets sent from the client device to the server and the data packets sent from the server to the client device. The at least one PHAST is operatively arranged to route/repeat the data packets sent from the client device to the server and the data packets sent from the server to the client device in accordance with the packet hopping protocol.

According to yet another aspect of the invention, the invention is a wireless local area network (LAN) for data communications. The wireless LAN includes a plurality of packet hopping access terminals (PHASTs) and a packet hopping gateway (PHG). Each PHAST includes a local transceiver for wirelessly transmitting data packets addressed to an associated client device and for wirelessly receiving data packets from the associated client device; and a first switchable LAN transceiver for wirelessly receiving the data packets addressed to the associated client device and for wirelessly transmitting the data packets received from the associated client device to one of another PHAST and the PHG using a point-to-point protocol. The PHG includes a second switchable LAN transceiver for wirelessly receiving the data packets transmitted by any of the PHASTs and for wirelessly transmitting each data packet addressed to the associated client devices to a selected PHAST using a point-to-point protocol; and a network interface for establishing communication with a server.

BRIEF DESCRIPTION OF DRAWINGS

These and further features of the present invention will be apparent with reference to the following description and drawings, wherein.

DISCLOSURE OF INVENTION

Figure 1:
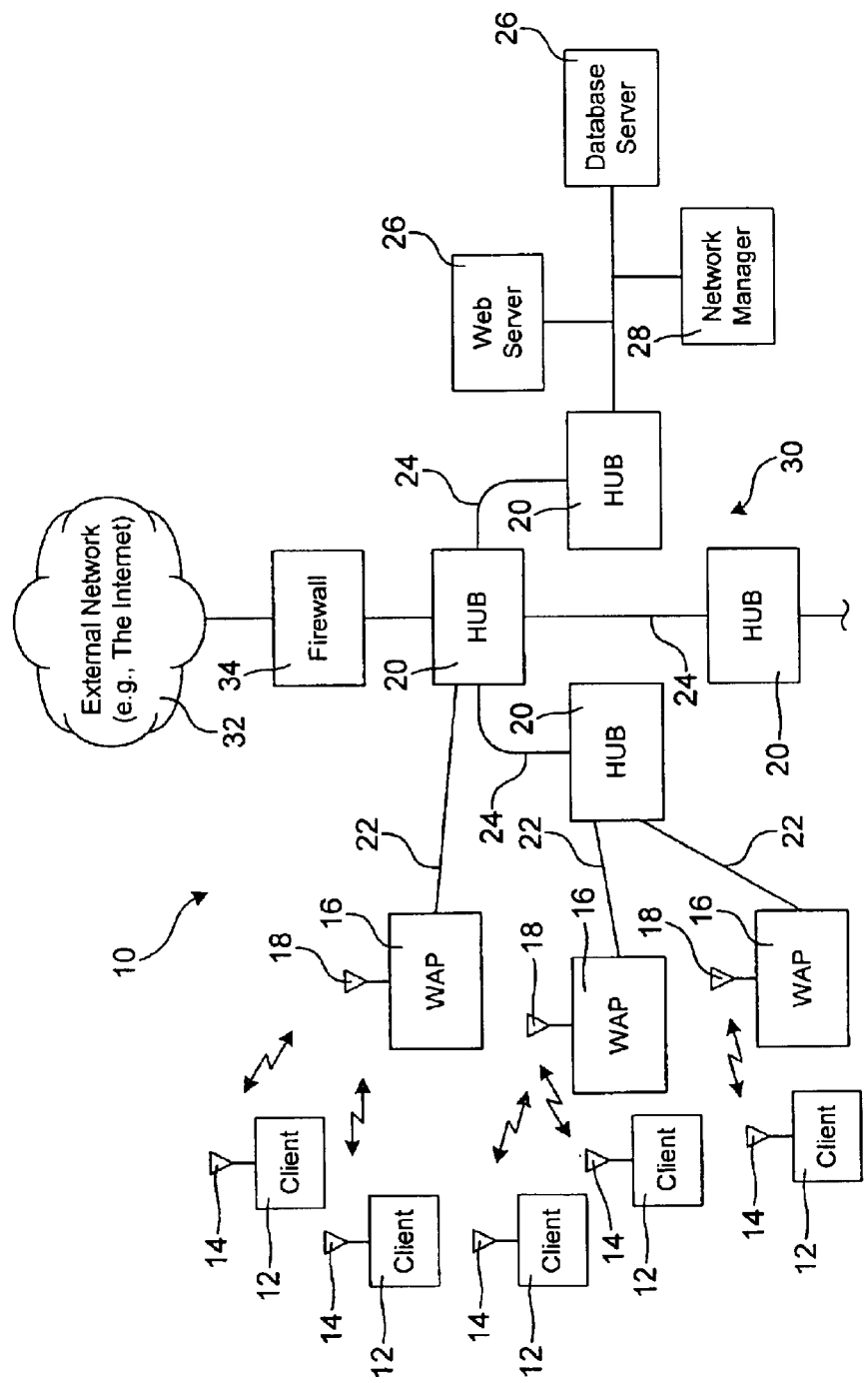
FIG. 1 is a schematic block diagram of a conventional network.

In the detailed description that follows, similar components have been given the same reference numerals, regardless of whether they are shown in different embodiments of the present invention. To illustrate the present invention in a clear and concise manner, the drawings may not necessarily be to scale and certain features may be shown in somewhat schematic form.

Figure 2:
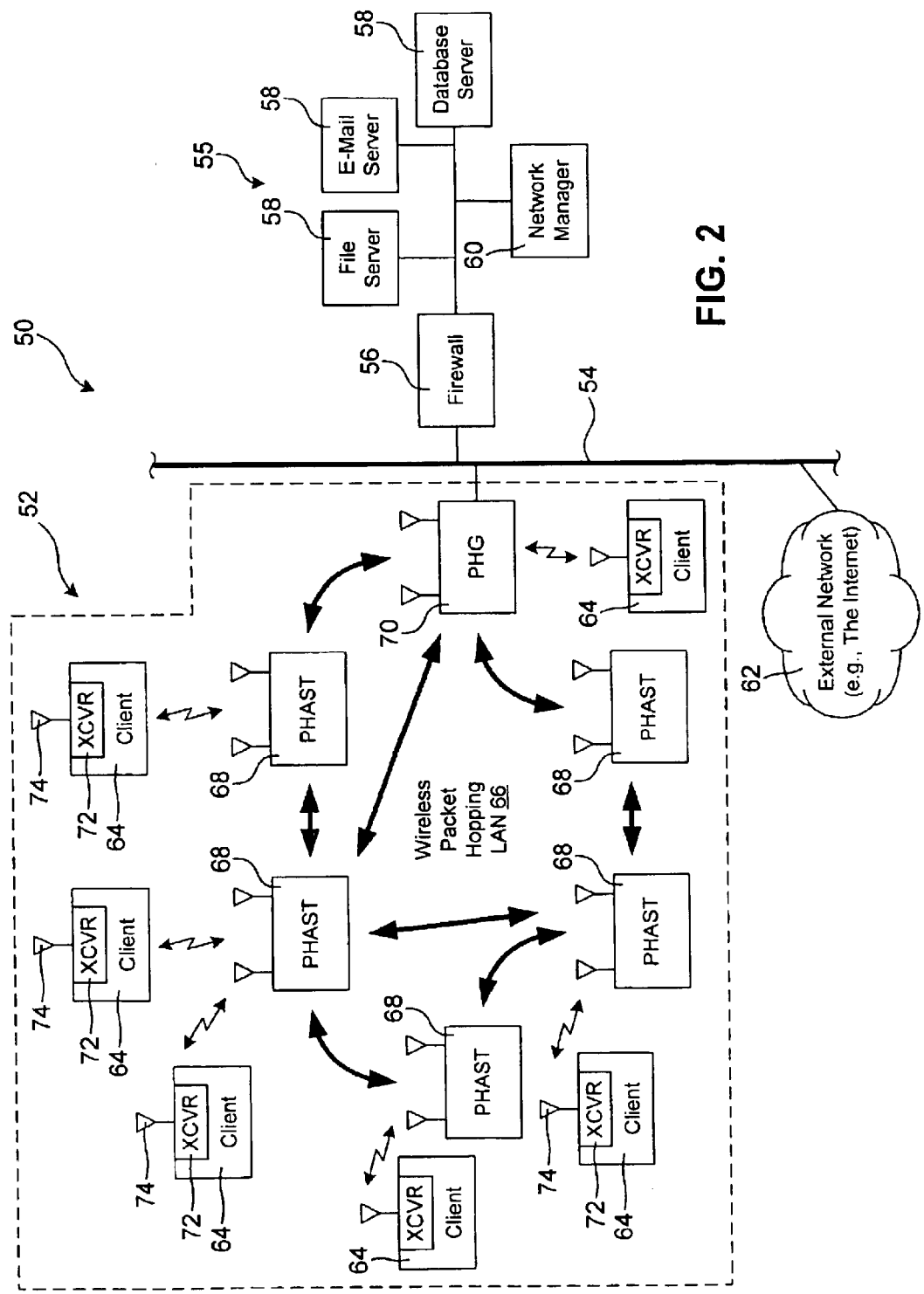
FIG. 2 is a schematic block diagram of an exemplary network according to the present invention.

Referring to FIG. 2, a network 50 according to the present invention is illustrated. The network 50 includes a wireless local area network (LAN) 52. The wireless LAN 52 is coupled to a wide area network (WAN) backbone 54. The WAN backbone 54 can represent, for example, an Ethernet or any other suitable wide area network infrastructure. In one example, the WAN backbone 54 includes a fiber optic medium with a bandwidth of 10 Gbps or higher.

The network 50 also includes a private LAN 55 coupled to the WAN backbone 54 via a firewall 56. The private LAN 55 (sometimes referred to as a corporate LAN since the private LAN often provides core computing services to a corporate or other organized entity) can include various servers 58. The servers 58 can include, for example, a world-wide-web server (also known as a "web" server or an Internet server), a database server, a file server, an electronic mail ("e-mail") server, a print server and so forth. As one skilled in the art will appreciate, the illustration of a file server, an e-mail server and a database server is merely exemplary and other servers 58 can be coupled in similar fashion. As used herein, the term server refers to both hardware and software that performs a service, such as hosting web pages that can be viewed from another computing device using a browser, executing applications to carry out computing tasks for other computing devices, providing a centralized location for shared files, controlling the rendering of print files for printers coupled to the network 50, and so forth. The private LAN 55 may also include a network manager terminal 60 which allows a network administrator to establish and control functionality of the private LAN 55 and/or the wireless LAN 52, and, if appropriate, other portions of the network 50, such as the firewall 56 and/or the WAN backbone 54.

The private LAN 55 can be coupled to the WAN backbone 54 via the firewall 56. As is known in the art, the firewall 56 provides information technology security to the network 50. That is, the firewall 56 minimizes the possibility of unauthorized access of the server 58 and/or network manager terminal 60 from devices connecting through the WAN backbone 54. In addition, the firewall 56 may be configured to minimize the exportation of data from one or more of the servers 58 and/or the network manager terminal 60. Also, additional computing devices, workstations and servers can be coupled to the network 50 on either a "secure" (or private) side of the firewall 56 or a "public" side of the firewall 56. In the illustrated arrangement, devices illustrated on the left side of the firewall 56 in FIG. 2 are located in a public area and devices illustrated on the right side of the firewall 56 in FIG. 2 (e.g., the private LAN 55) are located in a private or secure area.

Also coupled to the WAN backbone 54 can be an external network (or networks) 62. For example, the external network can be the Internet or any other wide area network (WAN).

The wireless LAN 52 is configured to allow client computing devices 64 to exchange data with the devices of the private LAN 55 (e.g., the servers 58 and/or network manager terminal 60) via the firewall 56 and WAN backbone 54. The client computing devices 64 can include various types of computers (e.g., general purpose machines that processes data according to a set of instructions). Most computers include a memory (which can include one or more volatile memory components and one or more nonvolatile memory components) for storing logic instructions and a processor (or processors) for executing those logic instructions. Therefore, the client devices 64 can include general purpose computers such as desktop computer systems, workstations, terminals, laptop or notebook computers, personal digital assistants (PDAs), and so forth. In addition, the client devices 64 can include peripheral devices or other computer equipment, including, for example, input/output devices such as image rendering equipment (e.g., printers, plotters, copy machines, etc.), scanners, digital senders, and so forth. In one embodiment, the client devices 64 can also include devices that exchange voice data (e.g., mobile telephones or handheld radios).

The client devices 64 can communicate with the servers 58, or with one another, by exchanging data packets. The data packets, as is known in the art, contain a message in electronic format along with header information used in delivering the data packet and ensuring the integrity of the data packet. A relatively large message can be broken down into multiple data packets depending on the "payload"

capacity of the data packets. However, it should be noted that the invention is not correspondingly limited in scope and for the purposes herein, the term data packet can include other types of data or information exchanges including, for example, video signals, audio signals, and any other type of information-containing signal broadcast to or from the client devices 64.

The wireless LAN 52 includes a wireless packet hopping network 66 (also referred to herein as a wireless packet hopping backbone for the wireless LAN 52) that includes at least one packet hopping access terminal (PHAST) 68 and at least one packet hopping gateway (PHG) 70. The client devices 64 communicate with the servers 58 via the wireless packet hopping LAN 66, the WAN backbone 54 and the firewall 56. More detailed operation of the PHAST device 68 and the PHG 70 will be described in greater detail below.

Each client device 64 can include a connectivity device, or transceiver 72, for wireless, bidirectional communications with at least one of the PHAST devices 68 and/or the PHG 70. For example, the transceiver 72 can be a network interface card (NIC) and associated antenna 74. In one embodiment, the NIC can operate using a communications protocol such as an 802.11b standard protocol.

Figure 4:
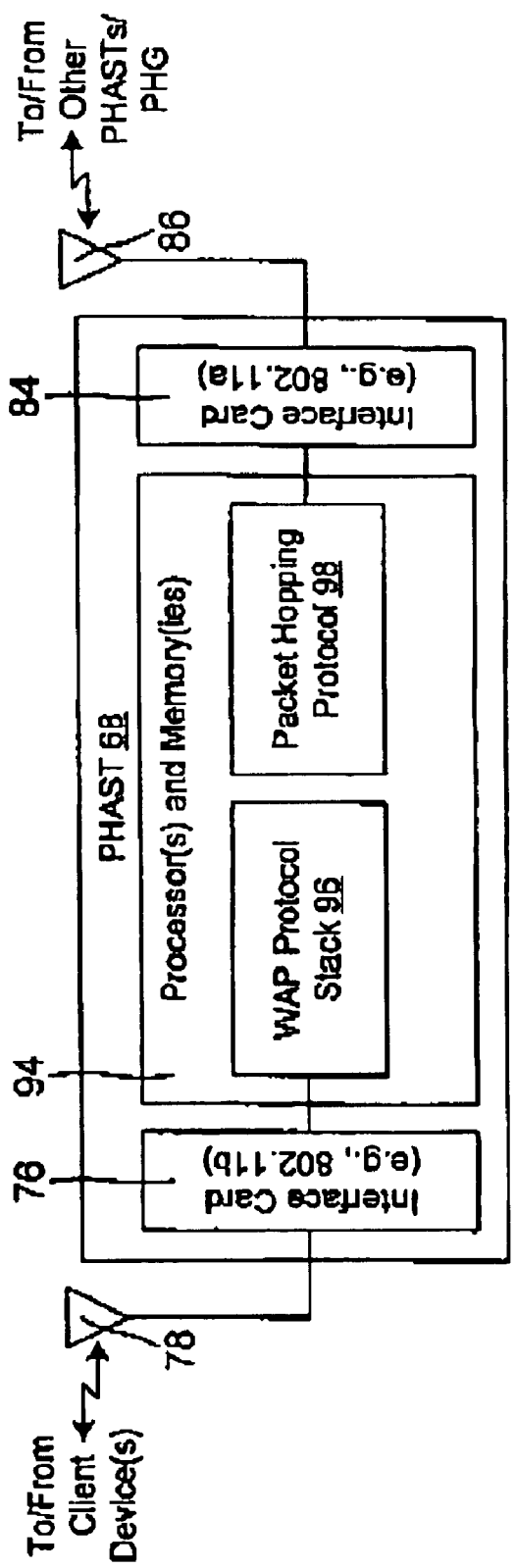
FIG. 4 is a schematic block diagram of a packet hopping access terminal (PHAST) for use in a network according to the present invention.

Referring briefly to FIG. 4, each PHAST device 68 includes a corresponding connectivity device for wireless, bidirectional data packet exchange with the client devices 64. The corresponding connectivity device in the PHAST devices 68 can be a local transceiver. The local transceiver of the PHAST device 68 can include, for example, an interface card 76 (e.g., a standard 802.11b NIC card) and an associated antenna 78.

Figure 5:
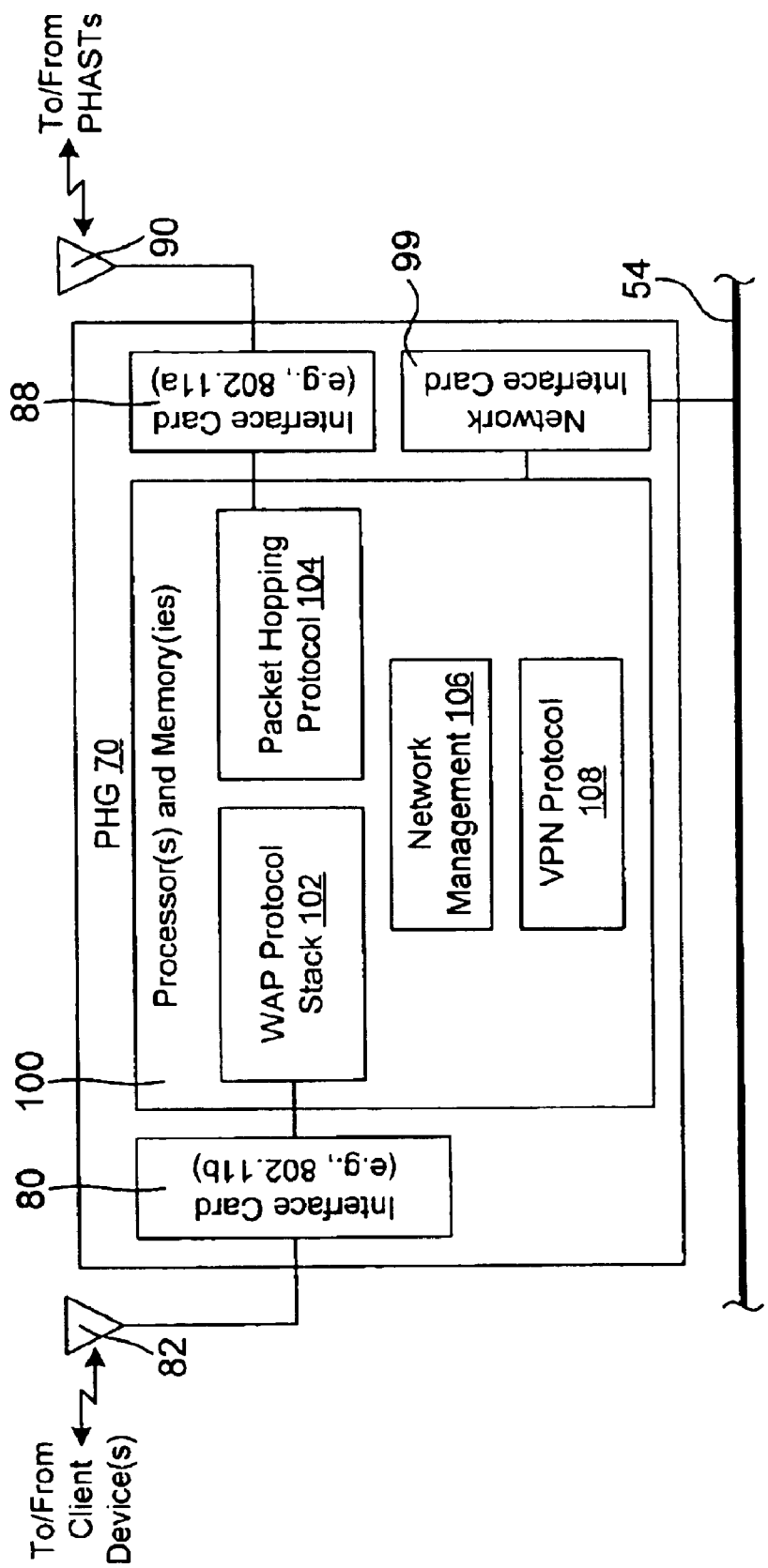
FIG. 5 is a schematic block diagram of a packet hopping gateway (PHG) for se with a network according to the present invention.

As indicated, the client devices 64 can also wirelessly communicate directly with the PHG 70. Referring briefly to FIG. 5, the PHG 70 can also be provided with a connectivity device for wireless, bidirectional communications with the client devices 64. The corresponding connectivity device in the PHG 70 can be a local transceiver. The local transceiver of the PHG 70 can include, for example, an interface card 80 (e.g., a standard 802.11b NIC card) and an associated antenna 82.

In general, each client device 64 communicates with a nearby PHAST device 68 according to a predetermined protocol for managing wireless communications. In most situations, the client devices 64 will communicate with the PHAST device 68 that is closest in proximity to the client device 64, or with the PHAST device 68 with which the signal strength is the highest. Should the client device 64 be located closest to the PHG 70, or share the highest signal strength with the PHG 70, the client device 64 can exchange data packets directly with the PHG 70 instead of communicating with one of the PHAST devices 68.

Upon receiving a data packet form a client device 64, each PHAST 68 will wirelessly retransmit (e.g., route/repeat) the data packet for delivery to the PHG 70. As indicated, the PHAST devices 68 handles communications from the client devices 64 to the PHG 70 using a packet hopping technique. Similarly, data packets intended for delivery to a client device 64 and received from the WAN backbone 54 by the PHG 70 are transmitted through the wireless packet hopping LAN 66 using the packet hopping technique. It is noted that communications directly between the client devices 64 and the PHG 70 need not be routed through any of the PHAST devices 68.

Briefly, the concept of packet hopping relates to the delivery of one or more data packets from a source to a destination via one or more intermediate stations. Features of the packet hopping protocol described herein are sometimes referred to in the art as ad hoc networking or ad hoc routing. In the illustrated embodiment, the client devices 64 can act as a source or destination and the PHG 70 acts as the corresponding destination or source. In the wireless LAN 52, the PHAST devices 68 function as the intermediate points.

The packet hopping technique can be implemented by a packet hopping protocol executed by the devices of the wireless LAN 52. The packet hopping protocol can include various networking features, such as a self-configuring features (also referred to as a self-discovery feature or a self-forming feature) where devices contained within the wireless LAN 52 determine the presence and functionality of the other devices contained within the wireless LAN 52. Upon discovery of the other devices (e.g., by tracking the transmission of data packets and acknowledgment signals), the packet hopping protocol can efficiently deliver data packets through the wireless LAN 52. Efficient delivery of data packets can include sending data packets through a minimum number of intermediate points (i.e., PHAST devices 68) before reaching an intended destination and using self-healing functionality (e.g., delivery of data packets to avoid congested nodes, compensate for a device that has lost power or otherwise is malfunctioning, etc.). The self configuring nature of the wireless LAN 52 allows for easy installation of the wireless LAN 52 since databases of logical device location and capabilities can be self populating and need not be configured by a network installer.

Once discovered, the components of the wireless packet hopping LAN 66 (the PHAST devices 68 and/or the PHG 70) maintain information indicating the network locations of each client device 64, or the PHAST device 68 or PHG 70 that each client device 64 is in direct communication with. It is noted that the functionality described herein is in the context of data communications between the client device 64 and the servers 58 or the network manager 60. However, peer-to-peer (i.e., client device 64 to client device 64) communications can be handled in the same manner (i.e., using the same packet hopping protocol).

Data packets received from the client device 64 by a particular PHAST 68 will be routed to the PHG 70 (for delivery to the appropriate server 58) using an available pathway through the wireless packet hopping LAN 66. For example, if the subject PHAST device 68 that receives the data packet from the client device 64 is within direct communication proximity with the PHG 70, the subject PHAST device 68 can wirelessly transmit the received data packet directly to the PHG 70. However, routing of the data packet to the PHG 70 via an additional PHAST device(s) 68 is contemplated, as depending on wireless LAN architecture, load, interference, etc.

Referring briefly to FIG. 4, transmission of a data packet from the PHAST device 68 to the PHG 70 or another PHAST device 68 can be carried out using a connectivity device such as a LAN transceiver. The LAN transceiver can also be configured to receive data packets from the PHG 70 or other PHAST devices 68. The LAN transceiver can include, for example, an interface card 84 (e.g., a standard 802.11a NIC) and an associated antenna 86. Referring briefly to FIG. 5, the PHG 70 is also provided with a corresponding connectivity device to receive data packets transmitted by the PHAST devices 68 and to transmit data packets to the PHAST devices 68. The connectivity device of the PHG 70 can be a LAN transceiver, such as an interface card 88 (e.g., a standard 802.11a NIC) and associated antenna 90.

In situations where the PHAST device 68 that receives data packets from the client device 64 is outside direct communications proximity with the PHG 70, the data packets are forwarded to the PHG 70 via one or more of the other PHAST devices 68 in the wireless packet hopping LAN 66. Depending on LAN 66 usage, buffer resources, external interference, signal strength and so forth, the packet hopping protocol determines a path for the data packet from the receiving PHAST device 68 to the PHG 70 (e.g., self-conforming functionality). As should be apparent, the delivery of data packets through the wireless LAN 52, and specifically the wireless packet hopping LAN 66 is carried out to make efficient use of the resources contained therein and to ease installation of the wireless LAN 52. The wireless packet hopping LAN 66 is logically configured as a "mesh," with no set delivery path for data packets. Data packets can be delivered through the wireless packet hopping LAN 66 by "hopping" (or skipping) one or more PHAST devices 68, even if the "hopped" device(s) is physically closer that the next device addressed to receive the data packet.

Without intending to be bound by theory, packet hopping is an efficient technique for re-transmitting data packets form a source to a destination through a series of intermediate points. An exemplary packet hopping protocol is available from MeshNetworks of 485 North Keller Road, Suite 250, Maitland, Fla. 32751 under the designation "MeshLAN" and under the designation "MultiHopping." The protocol available from MeshNetworks transforms wireless LAN cards (e.g., a standard 802.11 card) into a router/repeater to enhance the wireless reach of each subscriber (e.g., a client device 64) in the network.

In one implementation, the packet hopping protocol executed by the PHAST devices 68 and the PHG 70 adds multi-hopping peer-to-peer (e.g., PHAST device 68 to PHAST device 68 or PHAST device 68 to PHG 70) capabilities to off-the-shelf 802.11 cards. Such a packet hopping protocol can automatically shift transmissions from congested access points (i.e., PHAST devices 68) to uncongested ones to ease bottlenecks with the LAN and to improve overall network performance.

The transmission of data packets from the PHG 70 to the client devices 64 is carried out in the same manner, but in reverse direction. More particulary, if the destination client device 64 is in direct communication proximity to the PHG 70, the data packets will be transmitted to the client device 64 via the local transceiver (e.g., interface card 80 and antenna 82). If the destination client device 64 is in communication with one of the PHAST devices 68, the data packet is transmitted by the PHG 70 via the LAN transceiver (e.g., the interface card 88 and antenna 90) and routed through the wireless packet hopping LAN 66 to the desired PHAST device 68 using the packet hopping protocol. Once the desired PHAST device 68 receives the data packet, the data packet is transmitted to the client device 64 via the local transceiver of the PHAST device 68.

The configuration of the wireless LAN 52 allows for the wireless LAN 52 to be installed with relative ease in buildings of all types, including new construction and old buildings that were built with or without consideration for the networking of computing devices. The wireless LAN 52 can be deployed, for example, in an office environment where the PHAST devices 68 are placed strategically throughout the facility to interact with nearby client devices 64 and to relay data packets to and from the PHG 70. The PHG 70 can be located in an appropriate proximity to the WAN backbone 54 to that connection thereto can be established.

It is noted that the PHAST devices 68 and the PHG 70 will typically require a power source. In one embodiment, the PHAST devices 68 and the PHG 70 are connected to an available standard power source such as a conventional power outlet (e.g., in the United States, a 110 volt, 60 Hertz power source). In another embodiment, the PHAST devices 68 can be provided with their own power source such as a battery pack or solar power cell.

Since the PHAST devices 68 are not coupled to one another or to the PHG 70 with any hard-wired connections, the PHAST devices 68 can be quickly and easily deployed in desired locations without the need to run cables through walls, ceilings, floors and so forth. It should be apparent to one skilled in the art, that installation of the wireless packet hopping LAN 66 will result in a large time and economic savings. It is also noted that with the use of appropriate wireless transceivers and protocols, that no line of sight configuration is needed between the client devices 64 and the PHAST devices 68, between one PHAST device 68 and the other PHAST devices 68, or between the PHAST devices 68 and the PHG 70.

In one embodiment of the invention where 802.11b interface cards are used for communication between the client devices 64 and the PHAST devices 68 (or PHG 70), the bandwidth between the client devices 64 and the PHAST devices 68 (or PHG 70) can be approximately 11 Mbps. In an alternative configuration, the example the exemplary 802.11b interface card can be replaced with an 802.11g interface hardware and/or software. When 802.11a interface cards are used for communication among the PHAST devices 68 and the PHG 70, the bandwidth between each PHAST device 68 and the other PHAST devices 68 and/or the PHG 70 can be approximately 100 Mbps. As one skilled in the art will appreciate, the foregoing interface connection standards (e.g., the use of 802.11) and bandwidths are exemplary and can vary as different hardware and communication protocols are selected for these communication links.

Figure 3:
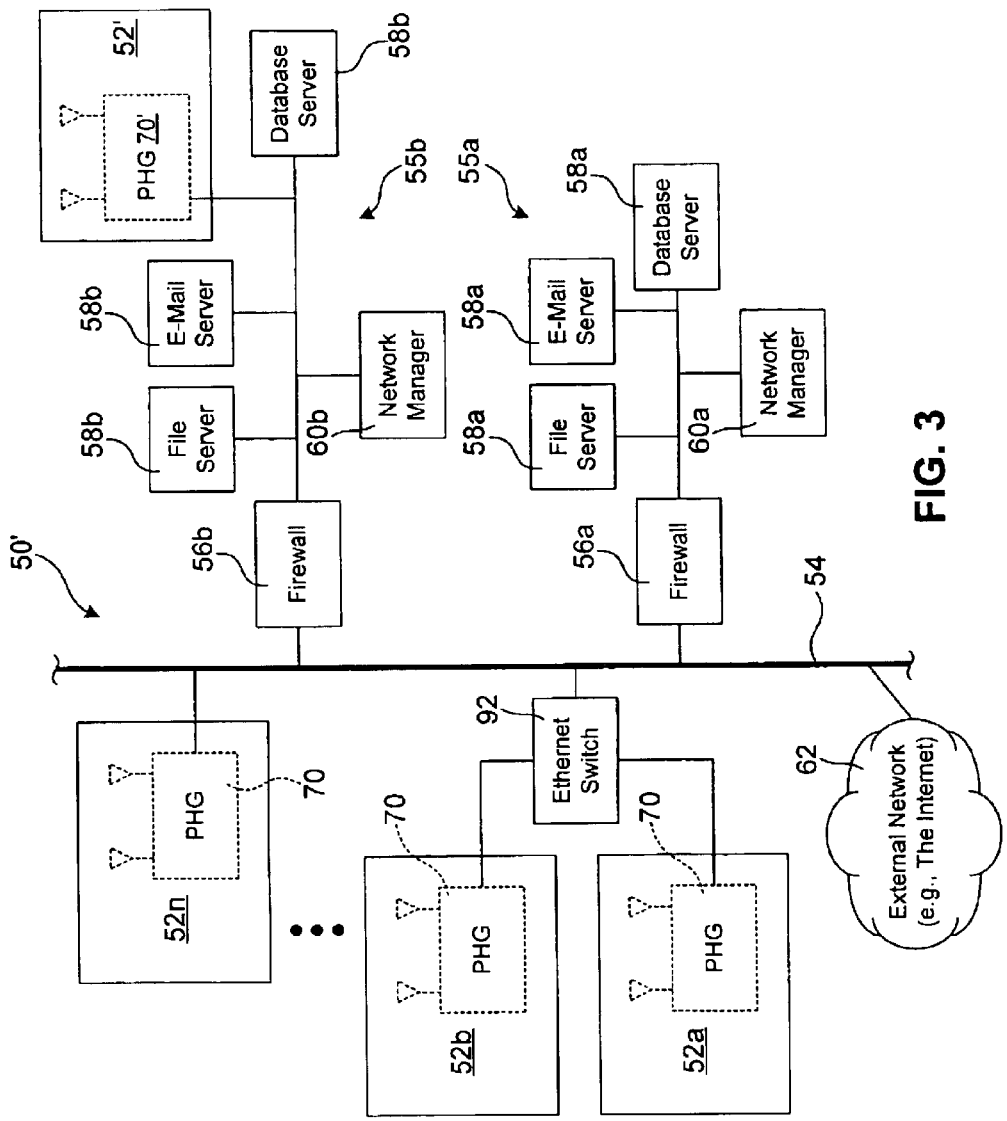
FIG. 3 is a schematic block diagram of another exemplary network in accordance with the present invention.

With additional reference to FIG. 3, an expanded data communications network 50' is illustrated. Similar to the network 50 of FIG. 2, the network 50' is provided with a WAN backbone 54, a first private LAN 55a (including a firewall 56a, various servers 58a, and a network manager workstation 60a) and a connection to an external network 62 (e.g., the Internet) via the WAN backbone 54. The expanded network 50' also includes multiple wireless LANs designated by reference numerals 52a through 52n. Optionally, the network 50' can include at least one additional private LAN 55 (illustrated as a second private LAN 55b that includes a firewall 56b, various servers 58b and a network manager workstation 60b).

The multiple wireless LANs 52 are used to provide connectivity for a large number of client devices 64 and/or throughout a physically large facility. For example, one of the wireless LANs 52 may be used to provide data networking for one floor of an office building or for a section of an office building that could span across more than one floor (e.g., a wing of a building). To increase the number of wireless LANs 52 that can be coupled to the WAN backbone 54 a multiplexing device, such as an Ethernet switch 92, can be used to couple one or more PHGs 70 to the WAN backbone 54.

Each wireless LAN 52a through 52n can operate using different channels and/or frequencies to minimize interference from one wireless LAN 52 to an adjacent wireless LAN 52. However, a channel or frequency can be used by one of the LANS 52 and the same channel or frequency can be used by another of the LANs 52 when the another of the LANs 52 is located sufficiently far enough from the first LAN 52 to avoid interference.

In one embodiment, the client devices 64 of each of the wireless LANs 52a through 52n present in the network 50' can communicate with the devices (e.g., the servers 58a and 58b) of multiple private LANs 55a and 55b (or, if present, additional private LANs 55). In an alternative arrangement, the client devices 64 of each wireless LAN 52a through 52n are limited to communication with a corresponding private LAN 55a or 55b (or, if present, additional private LANs 55). For instance, a landlord of a building in which the network 50' is deployed may provide the WAN backbone 54. Multiple tenants could use the WAN backbone 54 to form the network 50' by each tenant establishing at least one wireless LAN 52 and at least one private network 55.

Referring now to FIG. 4, an example embodiment of one of the PHAST devices 68 is schematically illustrated in greater detail. As indicated above, the PHAST device 68 includes a first wireless connectivity device (e.g., a local transceiver) for communicating with client devices 64 and a second wireless communications device (e.g., a LAN transceiver) for wirelessly communicating with other PHAST devices 68 and/or the PHG 70. In one embodiment, the local transceiver includes the interface card 76 (e.g., a standard 802.11b NIC) and associated antenna 78. In one embodiment, the LAN transceiver includes the interface card 84 (e.g., a standard 802.11a NIC) and associated antenna 86.

The PHAST device 68 also includes components for executing logic instructions for facilitating the data communications described herein. For example, the PHAST devices 68 can include circuitry 94 (e.g., a processor) that executes code containing the logic instructions. The PHAST device 68 can also include memory for storing the code/logic instructions. One skilled in the art will appreciate that multiple processors and/or memory components can be used for such purposes. In addition, all or a portion of such functionality can be implemented as part of the interface card 76 and/or interface card 84.

The PHAST device 68 can execute a wireless access point (WAP) protocol 96 and a packet hopping protocol 98. The WAP protocol 96 is responsible for managing and maintaining communications between the PHAST device 68 and the client devices 64. WAP protocols 96 are generally well known in the art and will not be described in greater detail. Briefly, the WAP protocol 96 allows the PHAST 68 to function as an access point for the client devices 64. The WAP protocol 96 can be executed directly by the interface card 76. The packet hopping protocol 98, as indicated above, manages the exchange of data packets among the PHAST devices 68 and between the PHAST device 68 and the PHG 70. The packet hopping protocol 98 can be executed directly by the interface card 84.

In an alternative embodiment of the PHAST 68, the local and LAN network transceivers can be implemented with the same hardware (e.g., the same interface card and antenna) and/or can share protocol functionality. In another example, the local and LAN networks can use the same frequency channel, but operate using different protocols, or vice versa (share the same protocol, but use different frequency channels).

Referring now to FIG. 5, an example embodiment of the PHG 70 is illustrated in greater detail. As indicated above, the PHG 70 can include a device (e.g., a local transceiver) circuit for wirelessly communicating directly with one or more client devices 64. Such a transceiver can include an interface card 80 (e.g., a standard 802.11b NIC) and an associated antenna 82. The PHG 70 also includes a communications device (e.g., a LAN transceiver) for establishing wireless communications with PHAST devices 68 of the wireless LAN 52. Such a LAN transceiver can include the interface card 88 (e.g., a standard 802.11a NIC) and the associated antenna 90. In addition, the PHG 70 can include an interface device 99, such as a network interface card, for communicating with the WAN backbone 54

In an alternative embodiment of the PHG 70, the local and LAN network transceivers can be implemented with the same hardware (e.g., the same interface card and antenna) and/or can share protocol functionality. In another example, the local and LAN networks can use the same frequency channel, but operate using different protocols, or vice versa (share the same protocol, but use different frequency channels).

Similar to the PHAST device 68, the PHG 70 can include circuitry 100 (e.g., a processor) for executing code to maintain and manage data communications with the client devices 64 and the PHAST devices 68. For example, the circuitry 100 can include a processor or processors and a memory or memories for respectively executing and storing code containing the logic instructions. As one skilled in the art will appreciate, the execution and/or storage of such code can be implemented by the interface cards 80 and/or 88, or by general purpose components.

The PHG 70 can execute protocols having a variety of functions. For example, the PHG 70 can execute a WAP protocol 102, a packet hopping protocol 104, various network management modules 106 and a virtual private network (VPN) protocol 108. Similar to the WAP protocol 96, the WAP protocol 102 manages communications with client devices 64 via the PHG's local transceiver (e.g., the interface card 80 and antenna 82) such that the PHG 70 can Function as a wireless access point for client devices 64. As one skilled in the art will appreciate, the WAP protocol 96 and 102 contain functionality for opening and maintaining data communication sessions between the client devices 64 and the PHAST devices 68 or the PHG 70.

Similar to the packet hopping protocol 98, the packet hopping protocol 104 maintains and manages the exchange of data packets between the PHG 70 and the PHAST devices 68 via the LAN transceiver (e.g., the interface card 88 and associated antenna 90). The packet hopping protocols 98 and 104 contain functionality for opening and maintaining sessions among the PHAST devices 68 and between the PHAST devices 68 and the PHG 70. As indicated, the packet hopping protocols 98 and 104 provide a router/repeater function such that data packets transmitted by a client device 64 to a PHAST device 68 are relayed to the PHG 70 (for ultimate delivery to the appropriate sever 58) or another client device 64 in an efficient manner. Similarly, data packets addressed for delivery to the client devices 64 are transmitted through the wireless packet hopping LAN 66. Such delivery of data packets can include directing the data packets through one or more PHAST devices 68 according to the packet hopping protocol.

Additional logic can be executed by the PHG 70 to establish communications with other network 50 components (e.g., the servers 58, the network manager 60) via the network interface device 99 and WAN backbone 54.

The network management functions 106 can include, for example, a domain name service (DNS). The DNS maintains a database of devices by name (in some networks, the names can be domain names) and logical addresses (in some networks, the addresses can be IP addresses). The network management functions 106 can also include a dynamic host configuration protocol (DHCP) that, in conjunction with the DNS, assigns addresses to the client devices 64 upon log-in to the wireless LAN 52. The DHCP functions to minimize the need to manually and/or permanently assign addresses to each device. Rather, the DHCP assigns an address from a pool of addresses to each client device 64 and/or each PHAST device 68 upon connection to the wireless LAN 52 in a dynamic fashion. The DHCP dynamically updates the DNS following any changes to the assigned addresses for each device. The information stored by the DNS may also be transmitted to the PHAST devices 68 to assist in the efficient handling of data packets through the LAN 52. Additional network information used by the PHG 70 and the PHAST devices 68 can include the "location" of each client device 64 (the "location" being the PHAST device 68 or the PHG 70 with which the client device 64 communicates). Alternatively, the DHCP can be arranged statically such that each device on the network has an assigned address that does not change from log-in to log-in (also referred to as start up to start up) with the network.

The network management functionality 106 can also include a directory service (such as a light weight directory protocol (LDAP)) to assist other devices (e.g., the PHAST devices 68) in the access a directory listings stored by the PHG 70. Such a network management function would allow devices in the network 50 to query a directory stored by the PHG to provide a common method of searching for network 50 configuration information (e.g., domain names, addresses, etc.).

The network management functionality 106 can also include a simple network management protocol (SNMP) for monitoring and controlling the wireless LAN 52. In a typical network (e.g., the network 10 of FIG. 1) that runs SNMP, data concerning the activity of each network device (e.g., the hubs 20, the WAPs 16, and other devices that are apart of the network 10, such as bridges, routers, etc.) are transmitted to a network manager terminal (e.g., the network manager 28) that oversees the network. The network manager terminal executes an agent which assembles information for a management information base (MIB) that contains a data structure of obtainable functionality for each device deployed in the network, as well as the identify of the functions that can be controlled by the network manager terminal.

According to one embodiment of the present invention, the foregoing functionality of a network control workstation can be carried out by the PHG 70 as part of the network management functions 106 of the wireless LAN 52. In this embodiment, a MIB and complete SNMP are stored and executed on the PHG 70. Thus, these tasks are removed from a separate device (e.g., the network manager 60). In addition, the DNS, DHCP and LDAP functions can be hosted by the PHG 70 and removed from another device (e.g., the network manager 60). Accordingly, control over the wireless LAN 52 is centralized in the PHG 70. Hosting these functions in the PHG 70 reduces the tasks required to be carried out by the network manager 60 and reduces the amount of information that needs to be transmitted over the WAN backbone 54 and through the firewall 56. In the expanded communications network 50', each PHG 70 hosts the network management functions 106 for each corresponding wireless LAN 52. Therefore, the processing associated with network management can be distributed to reduce the processing burden of the network manager 60 and reduce the traffic over the WAN backbone 54. The network manager functions 106 can also include additional tasks such as provisioning, administration, traffic control, statistics, billing, and so forth.

The wireless LAN 52 provides flexibility in the physical location of the client devices 64 without the need for reconfiguring the client device 64 or the network 50 if one of the client devices 64 moves from one location in the wireless LAN 52 to another location, or to another wireless LAN 52 (FIG. 3). For example, a person using a laptop computer in their office may regularly communicate with one particular nearby PHAST device 68. However, that person may take their laptop computer to a meeting room that could be located in close proximity to a different PHAST device 68 located within the same wireless LAN 52 or on a different wireless LAN 52. When communication with the network 50 or 50' is re-established, the network management functions 106 of the PHG 70 act to establish a session with the client device 64. Such log-in to the wireless LAN 52 is transparent to the client device 64 and is without the need for interaction by the user of the client device 64.

As indicated above, the wireless LAN 52 is on a public side of the firewall 56. Accordingly, it can be beneficial to provide some level of security for the exchange of data over the wireless LAN 52. As part of a security scheme for the network 50, the PHG 70 can be provided with the VPN protocol 108. The VPN protocol 108 is configured to dynamically set up and tear down virtual private networks between the client devices 64 and the private LAN 55 (using VPN protocols as interpreted by the client devices 64 and the firewall 56) servers 58 so that information is exchanged using a security mechanism, such as encryption. In one embodiment, the PHG 70 brokers and manages the logical encryption link between the client devices 64 and the firewall 56. The firewall 56 decrypts encrypted data packets sent by the client devices 64 to the servers 58 and places corresponding unencrypted data packets on the private LAN 55. Similarly, the client devices 64 decrypts incoming encrypted data packets to make the data packets available for local use by the applications and protocols executed by the receiving client device 64.

Traditionally, VPNs involved a logically static connection between a host device and a client device. However, VPN protocol 108 contemplated herein dynamically configures the VPNs in the network 50 in a similar way to the way the DHCP assigns addresses to the client devices 64. For example, VPN encryption keys can be provided to authorized client devices 64 at log-in. It is noted that additional security schemes can be added to the client devices 64, the wireless LAN 52 and the network 50 to minimize security risks when exchanging data between peer client devices 64, or with the external network 62.

In the foregoing embodiment, the PHG 70 can be used to assist in establishing the VPN communication links between the client devices 64 and the firewall 56 as each client device initiates communication with the wireless LAN 52. With additional reference to FIG. 3, an alternative arrangement for coupling a wireless LAN 52' to the private LAN 55 is illustrated. In this arrangement, the network interface 99 couples a PHG 70' to the private LAN 55. Accordingly, communications between the client devices 64 of the wireless LAN 52' and the servers 58 of the private network 55 are not directed through the WAN backbone 54 and/or the firewall 56. The PHG 70' can be configured to dynamically set up and tear down VPN connections, or logical encryption links, between the client devices 64 of the wireless LAN 52' and the PHG 70' itself. The PHG 7' decrypts encrypted data packets sent by the client devices 64 to the servers 58 and places corresponding unencrypted data packets on the private LAN 55. Similarly, the PHG 70' encrypts data packets to be delivered from a device on the private LAN 55 to one or more of the client devices 64.

Although particular embodiments of the invention have been described in detail, it is understood that the invention is not limited correspondingly in scope, but includes all changes, modifications and equivalents coming within the spirit and terms of the claims appended hereto.

For example, the wireless packet hopping LAN 66 can be implemented using an asynchronous transfer mode (ATM) embodiment where the LAN transceiver and associated packet hopping protocol of each PHAST 68 and the PHG 70 is replaced with a point-to-point transceiver. Switches can be deployed at each node (i.e., each PHAST 68 and the PHG 70) to establish the mesh back-haul network arrangement of the wireless packet hopping LAN 66 described above. In such an embodiment, data packets can be delivered to hop from PHAST 68 (or PHG 70) to PHAST 68 (or PHG 70). However, since ATM protocols are configured in a point-to-point implementation (i.e., the source and the destination of data packet transfer links are static), this modified embodiment may not include the dynamic, self-configuring routing of the packet hopping implementation described above.

What is claimed is:

1. A wireless local area network (LAN) for data communications, comprising:
   a first packet hopping access terminal, including:
      a first transceiver for wirelessly transmitting data packets addressed to a first client device and for wirelessly receiving data packets from the first client device; and
      a second transceiver for wirelessly receiving the data packets addressed to the first client device and for wirelessly transmitting the data packets received from the first client device in accordance with a packet hopping protocol, the packet hopping protocol including a data packet router/repeater function; and
   a packet hopping gateway, including:
      a third transceiver for wirelessly receiving the data packets transmitted by the first packet hopping access terminal and for wirelessly transmitting the data packets addressed to the first client device in accordance with the packet hopping protocol;
      a network interface for establishing communication with a server; and
      a security function for dynamically configuring a virtual private network between a firewall and each of a plurality of client devices as each client device initiates communication with the wireless LAN, the firewall disposed between the packet hopping gateway and the server.

2. The wireless LAN according to claim 1, further comprising a second packet hopping access terminal, the second packet hopping access terminal including a fourth transceiver for wirelessly receiving the data packets addressed to the first client device; for wirelessly transmitting the data packets addressed to the first client device to the first packet hopping access terminal in accordance with the packet hopping protocol; for wirelessly receiving the data packets from the first client device and transmitted by the first packet hopping access terminal; and for wirelessly transmitting the data packets from the first client device to the packet hopping gateway in accordance with the packet hopping protocol.

3. The wireless LAN according to claim 2, wherein the second packet hopping access terminal further includes a fifth transceiver for wirelessly transmitting data packets addressed to a second client device and for wirelessly receiving data packets from the second client device and wherein the fourth transceiver wirelessly receives the data packets addressed to the second client device and wirelessly transmits the data packets from the second client device to the packet hopping gateway in accordance with the packet hopping protocol.

4. The wireless LAN according to claim 1, wherein the packet hopping gateway further includes a local transceiver for wirelessly transmitting data packets addressed to another client device and for wirelessly receiving data packets from the another client device.

5. The wireless LAN according to claim 1, wherein the packet hopping gateway carries out network management functions.

6. The wireless LAN according to claim 5, wherein the network management functions include dynamic assignment of addresses to a plurality of client devices as each client device initiates communication with the wireless LAIN.

7. The wireless LAN according to claim 5, wherein the network management functions include maintenance of a database of wireless LAN devices by logical name.

8. The wireless LAN according to claim 5, wherein the network management functions include a directory service.

9. The wireless LAN according to claim 1, wherein the packet hopping gateway includes a security function for dynamically configuring a virtual private network between the packet hopping gateway and each of a plurality of client devices as each client device initiates communication with the wireless LAN.

10. The wireless LAN according to claim 9, wherein the network interface is coupled directly to a private LAN, the private LAN including the server.

11. The wireless LAN according to claim 1, wherein the network interface is coupled directly to a private LAN, the private LAN including the server.

12. The wireless LAN according to claim 1, wherein the network interface establishes communication with the server via a wide area network backbone.

13. The wireless LAN according to claim 1, wherein the first transceiver operates using an 802.11b interface standard.

14. The wireless LAN according to claim 1, wherein the first transceiver operates using an 802.11b interface standard and the second and third transceivers operate using an 802.11a interface standard.

15. The wireless LAN according to claim 1, wherein the first transceiver operates using an 802.11g interface standard and the second and third transceivers operate using an 802.11a interface standard.

16. The wireless LAN according to claim 1, wherein the second and third transceivers operate using an 802.11a interface standard.

17. The wireless LAN according to claim 1, wherein the first, second and third transceivers operate using a common protocol.

18. The wireless LAN according to claim 17, wherein the first transceiver operates using a first frequency channel and the second and third transceivers operate using a second frequency channel different than the first frequency channel.

19. The wireless LAN according to claim 17, wherein the first, second and third transceivers operate using a common frequency channel.

20. The wireless LAN according to claim 1, wherein the first, second and third transceivers operate using a common frequency channel.

21. The wireless LAN according to claim 20, wherein the first transceiver operates using a first protocol and the second and third transceivers operate using a second protocol different than the first protocol.

22. The wireless LAN according to claim 1, wherein the first transceiver operates using a first protocol and the second and third transceivers operate using a second protocol different than the first protocol.

23. The wireless LAN according to claim 1, wherein the packet hopping protocol includes a self-discovery feature used to identify devices within the wireless LAN.

24. The wireless LAN according to claim 1, wherein the packet hopping protocol includes a self-healing feature to reroute data packets throughout the wireless LAN based on network conditions.

25. The wireless LAN according to claim 1, further comprising a plurality of packet hopping access terminals and wherein the packet hopping protocol includes a self-configuring feature used to establish data pathways among the plurality of packet hopping access terminals and the packet hopping gateway, the data pathways being dynamically updated based on network conditions.

26. The wireless LAN according to claim 1, wherein the first transceiver and the second transceiver are implemented with common hardware.

27. The wireless LAN according to claim 1, wherein the first transceiver is implemented with a first interface assembly and the second transceiver is implemented with a second interface assembly.

28. A communications network; comprising:
a wide area network backbone;
a first wireless LAN according to claim 1, wherein the packet hopping gateway is coupled to the wide area network backbone via the network interface; and
the server coupled to the wide area network backbone via a firewall.

29. The communications network according to claim 28, further comprising an external network coupled to the wide area network backbone.

30. The communications network according to claim 28, further comprising a second wireless LAN, wherein a packet hopping gateway of the second wireless LAN is coupled to the wide area network backbone via a network interface of the packet hopping gateway of the second wireless LAN.

31. The communications network according to claim 30, wherein the server and the firewall comprise a first private LAN and the communications network further comprises a second private LAN having a second server coupled to the wide area network backbone via a second firewall.

32. The communications network according to claim 31, wherein the first wireless LAN and the first private LAN are configured to exchange data, the second wireless LAN and the second private LAN are configured to exchange data, the first wireless LAN is logically isolated from the second private LAN and the second wireless LAN is logically isolated from the first private LAN.

33. The communications network according to claim 30, wherein the packet hopping gateways of the first and the second wireless LANs are coupled to the wide area network backbone via a multiplexing device.

34. The communications network according to claim 28, further comprising a second packet hopping access terminal, the second packet hopping access terminal including a fourth transceiver for wirelessly receiving the data packets addressed to the first client device; for wirelessly transmitting the data packets addressed to the first client device to the first packet hopping access terminal in accordance with the packet hopping protocol; for wirelessly receiving the data packets from the first client device and transmitted by the first packet hopping access terminal; and for wirelessly transmitting the data packets from the first client device to the packet hopping gateway in accordance with the packet hopping protocol.

35. The communications network according to claim 34, wherein the second packet hopping access terminal further includes a fifth transceiver for wirelessly transmitting data packets addressed to a second client device and for wirelessly receiving data packets from the second client device and wherein the fourth transceiver wirelessly receives the data packets addressed to the second client device and wirelessly transmits the data packets from the second client device to the packet hopping gateway in accordance with the packet hopping protocol.

36. The communications network according to claim 28, wherein the packet hopping gateway further includes a local transceiver for wirelessly transmitting data packets addressed to another client device and for wirelessly receiving data packets from the another client device.

37. The communications network according to claim 28, wherein the packet hopping gateway carries out network management functions, the network management functions comprised of one or more functions selected from dynamic assignment of addresses to a plurality of client devices as each client device initiates communication with the wireless LAN, maintenance of a database of wireless LAN devices by logical name, a directory service, and combinations thereof.

38. The communications network according to claim 28, wherein the packet hopping gateway includes a security function for dynamically configuring a virtual private network between a firewall and each of a plurality of client devices as each client device initiates communication with the wireless LAN, the firewall disposed between the wide area network backbone and the server.

39. The communications network according to claim 28, wherein the packet hopping protocol includes features comprised of one or more functions selected from a self-discovery feature used to identify devices within the wireless LAN, a self-healing feature to reroute data packets throughout the wireless LAN based on network conditions, a self-configuring feature used to establish data pathways among additional packet hopping access terminals and the packet hopping gateway where the data pathways being dynamically updated based on network conditions, and combinations thereof.

40. A data communications network comprising:
a packet hopping gateway (PHG) including a network interface for establishing communication with a server via a wide area network backbone and a transceiver for wirelessly receiving data packets originating from a client device and addressed to the server and wirelessly transmitting data packets originating from the server and addressed to the client device in accordance with a packet hopping protocol, and the PHG operatively arranged to dynamically configure a virtual private network between a firewall and the client device as the client device initiates communication with the data communications network, the firewall disposed between the wide area network backbone and the server; and
at least one packet hopping access terminal (PHAST), the at least one PHAST including at least one transceiver operative arranged to act as an intermediate transmission node for the data packets sent from the client device to the server and the data packets sent from the server to the client device, and the at least one PHAST operatively arranged to route/repeat the data packets sent from the client device to the server and the data packets sent from the server to the client device in accordance with the packet hopping protocol.

41. A wireless local area network (LAN) for data communications, comprising a plurality of packet hopping access terminals (PHASTs) and a packet hopping gateway (PHG), wherein:

each PHAST includes:
 a local transceiver for wirelessly transmitting data packets addressed to an associated client device and for wirelessly receiving data packets from the associated client device; and
 a first switchable LAN transceiver for wirelessly receiving the data packets addressed to the associated client device and for wirelessly transmitting the data packets received from the associated client device to one of another PHAST and the PHG using a point-to-point protocol; and the PHG includes:
 a second switchable LAN transceiver for wirelessly receiving the data packets transmitted by any of the PHASTs and for wirelessly transmitting each data packet addressed to the associated client devices to a selected PHAST using a paint-to-point protocol; and
 a network interface for establishing communication with a server.

42. The wireless LAN according to claim 41, wherein the point-to-point protocol is asynchronous transfer mode (ATM).

43. The wireless LAN according to claim 41, wherein source and destination addresses used by the first and second switchable LAN transceivers are selected so that the PHASTs and the PHG are operatively arranged as a wireless mesh backbone.

44. The wireless LAN according to claim 1, wherein plural packet hopping access terminals (PHASTs) and the packet hopping gateway (PHG) establish a backbone network infrastructure having data pathways among the second transceivers of the PHASTs and the PHG third transceiver to thereby define a wireless packet hopping LAN for the intermediate transmission of:

data packets sent by the client device and received by a first transceiver of one of the PHASTs for delivery to the server, and data packets sent by the server for delivery to the client.

45. The wireless LAN according to claim 44, wherein the client device is excluded from the wireless packet hopping LAN established by the PHASTs and PHG.

46. The wireless LAN according to claim 44, wherein the client device communicates directly with the first transceiver of a PHAST disposed within a communications proximity of the client.

47. The wireless LAN according to claim 44, wherein the first transceiver of each PHAST establishes a localized wireless network with one or more client devices that are disposed within a communications proximity of the first transceiver of the PHAST.

48. The wireless LAN according to claim 47, wherein the localized wireless network operates with a protocol other than the packet hopping protocol.

49. A wireless local area network (LAN) for a plurality of client devices, comprising:

a packet hopping gateway (PHG) having:
 a LAN transceiver operating in accordance with a packet hopping protocol that includes a data packet router/repeater function, and
 a network interface for establishing communication with a device external to the wireless LAN; and a plurality of packet hopping access terminals (PHASTs) each having:
 a local transceiver for establishing wireless communication with one or more of the client devices, and
 a LAN transceiver operating in accordance with the packet hopping protocol that includes a data packet router/repeater function; wherein:

the LAN transceiver of the PHG and the LAN transceiver of each PHAST establish an intermediate network infrastructure between the client devices and the external device, the network infrastructure including dynamically configurable and wireless data pathways for the delivery of:

data packets sent by a client device and received by the local transceiver of one of the PHASTs for delivery to the external device, and data packets sent by the external device for delivery to the client via the PHG.

50. The wireless LAN according to claim 49, wherein the PHG further includes a local transceiver for establishing wireless communication with one or more of the client devices.

51. The wireless LAN according to claim 49 wherein the PHG carries out network management functions selected from dynamic assignment of addresses to the client devices as each client device initiates communication with the wireless LAN, maintenance of a database of wireless LAN devices by logical name, a directory service and combinations thereof.

52. The wireless LAN according to claim 49, wherein the PHG dynamically configures a virtual private network (VPN) between a firewall and each client device as each client device initiates communication with the wireless LAN.

53. The wireless LAN according to claim 52, wherein the firewall is logically disposed between the PHG and the external device.

54. The wireless LAN according to claim 49, wherein the network interface is coupled directly to a private LAN, the private LAN including the external device, the external device being a server.

55. The wireless LAN according to claim 49, wherein the network interface establishes communication with the external device via a wide area network backbone.

56. The wireless LAN according to claim 49, wherein the packet hopping protocol includes a self-discovery feature used to identify devices within the intermediate network infrastructure.

57. The wireless LAN according to claim 49, wherein the packet hopping protocol includes a self-healing feature to reroute data packets throughout the intermediate network infrastructure based on network conditions.

58. The wireless LAN according to claim 49, wherein the local and LAN transceivers of each PHAST are implemented with common hardware.

59. The wireless LAN according to claim 49, wherein one or more of the client devices are excluded from the intermediate network infrastructure.

60. The wireless LAN according to claim 49, wherein the local transceiver of each PHAST establishes a localized wireless network with one or more client devices that are disposed within a communications proximity of the local transceiver of the PHAST.

61. The wireless LAN according to claim 60, wherein the localized wireless network operates with a protocol other than the packet hopping protocol.

62. A communications network; comprising:
- a wireless LAN according to claim 49, wherein the PHG is coupled to a wide area network backbone via the network interface; and
- a server coupled to the wide area network backbone via a firewall.

63. The communications network according to claim 62, further comprising a second wireless LAN coupled to the wide area network backbone via a network interface of a PHG of the second wireless LAN.

64. The communications network according to claim 63, wherein the server and the firewall comprise a first private LAN and the communications network further comprises a second private LAN having a second server coupled to the wide area network backbone via a second firewall, wherein the server of the first private LAN is excluded from exchanging data packets with clients serviced by the second wireless LAN and the server of the second private LAN is excluded from exchanging data packets with clients serviced by the first wireless LAN.

65. A wireless local area network (LAN), comprising:
- a wireless packet hopping sub-LAN including:
  - a packet hopping gateway (PHG) having a network interface to an external network and a LAN transceiver for wireless communications within the wireless packet hopping sub-LAN using a packet hopping protocol that includes a data packet router/repeater function; and
  - at least one packet hopping access terminal (PHAST) having a LAN transceiver for wireless communications within the wireless packet hopping sub-LAN using the packet hopping protocol; and
  - a localized wireless sub-network for each PHAST defined by a communications proximity of a local transceiver of the PHAST, the local transceiver for establishing communication with one or more client devices disposed within the communications proximity.

66. The wireless LAN according to claim 65, wherein the wireless packet hopping sub-LAN defines a backbone network infrastructure for the transmission of data packets between the localized wireless sub-networks and the external network.

67. The wireless LAN according to claim 65, further comprising a localized wireless sub-network defined by a communications proximity of a local transceiver of the PHG, the local transceiver of the PHG for establishing communication with one or more client devices disposed within the communications proximity of the local transceiver of the PHG.

68. The wireless LAN according to claim 65, wherein the PHG carries out network management functions selected from dynamic assignment of addresses to the client devices as each client device initiates communication with the wireless LAN, maintenance of a database of wireless LAN devices by logical name, a directory service and combinations thereof.

69. The wireless LAN according to claim 65, wherein the PHG dynamically configures a virtual private network (VPN) between a firewall of the external network and each client device as each client device initiates communication with the wireless LAN.

70. The wireless LAN according to claim 65, wherein the network interface is coupled directly to the external network, the external network being a private LAN having at least one server.

71. The wireless LAN according to claim 65, wherein the network interface establishes communication with the external network via a wide area network backbone.

72. The wireless LAN according to claim 65, wherein the packet hopping protocol includes a self-discovery feature used to identify devices within the wireless packet hopping sub-LAN.

73. The wireless LAN according to claim 65, wherein the packet hopping protocol includes a self-healing feature to reroute data packets throughout the wireless packet hopping sub-LAN based on network conditions.

74. The wireless LAN according to claim 65, wherein the local and LAN transceivers of each PHAST are implemented with common hardware.

75. The wireless LAN according to claim 65, wherein one or more of the client devices are excluded from the wireless packet hopping sub-LAN.

76. The wireless LAN according to claim 65, wherein each localized wireless sub-network operates with a protocol other than the packet hopping protocol.

77. A communications network; comprising:
- a wireless LAN according to claim 65, wherein the PHG is coupled to a wide area network backbone via the network interface; and
- a server coupled to the wide area network backbone via a firewall.

78. The communications network according to claim 77, further comprising a second wireless LAN coupled to the wide area network backbone via a network interface of a PHG of the second wireless LAN.

79. The communications network according to claim 78, wherein the server and the firewall comprise a first private LAN and the communications network further comprises a second private LAN having a second server coupled to the wide area network backbone via a second firewall, wherein the server of the first private LAN is excluded from exchanging data packets with clients serviced by the second wireless LAN and the server of the second private LAN is excluded from exchanging data packets with clients serviced by the first wireless LAN.

80. A wireless local area network (LAN) for data communications, comprising:
- a first packet hopping access terminal, including:
  - a first transceiver for wirelessly transmitting data packets addressed to a first client device and for wirelessly receiving data packets from the first client device; and
  - a second transceiver for wirelessly receiving the data packets addressed to the first client device and for wirelessly transmitting the data packets received from the first client device in accordance with a packet hopping protocol, the packet hopping protocol including a data packet router/repeater function; and
- a packet hopping gateway, including:
  - a third transceiver for wirelessly receiving the data packets transmitted by the first packet hopping access terminal and for wirelessly transmitting the data packets addressed to the first client device in accordance with the packet hopping protocol;
  - a network interface for establishing communication with a server; and
  - a security function for dynamically configuring a virtual private network between the packet hopping gateway and each of a plurality of client devices as each client device initiates communication with the wireless LAN.

81. The wireless LAN according to claim 80, further comprising a second packet hopping access terminal, the second packet hopping access terminal including a fourth transceiver for wirelessly receiving the data packets addressed to the first client device; for wirelessly transmitting the data packets addressed to the first client device to the first packet hopping access terminal in accordance with the packet hopping protocol; for wirelessly receiving the data packets from the first client device and transmitted by the first packet hopping access terminal; and for wirelessly transmitting the data packets from the first client device to the packet hopping gateway in accordance with the packet hopping protocol.

82. The wireless LAN according to claim 81, wherein the second packet hopping access terminal further includes a fifth transceiver for wirelessly transmitting data packets addressed to a second client device and for wirelessly receiving data packets from the second client device and wherein the fourth transceiver wirelessly receives the data packets addressed to the second client device and wirelessly transmits the data packets from the second client device to the packet hopping gateway in accordance with the packet hopping protocol.

83. The wireless LAN according to claim 80, wherein the packet hopping gateway further includes a local transceiver for wirelessly transmitting data packets addressed to another client device and for wirelessly receiving data packets from the another client device.

84. The wireless LAN according to claim 80, wherein the packet hopping gateway carries out network management functions.

85. The wireless LAN according to claim 84, wherein the network management functions include dynamic assignment of addresses to a plurality of client devices as each client device initiates communication with the wireless LAN.

86. The wireless LAN according to claim 84, wherein the network management functions include maintenance of a database of wireless LAN devices by logical name.

87. The wireless LAN according to claim 84, wherein the network management functions include a directory service.

88. The wireless LAN according to claim 80, wherein the network interface is coupled directly to a private LAN, the private LAN including the server.

89. The wireless LAN according to claim 80, wherein the network interface is coupled directly to a private LAN, the private LAN including the server.

90. The wireless LAN according to claim 80, wherein the network interface establishes communication with the server via a wide area network backbone.

91. The wireless LAN according to claim 80, wherein the first transceiver operates using an 802.11b interface standard.

92. The wireless LAN according to claim 80, wherein the first transceiver operates using an 802.11b interface standard and the second and third transceivers operate using an 802.11a interface standard.

93. The wireless LAN according to claim 80, wherein the first transceiver operates using an 802.11g interface standard and the second and third transceivers operate using an 802.11a interface standard.

94. The wireless LAN according to claim 80, wherein the second and third transceivers operate using an 802.11a interface standard.

95. The wireless LAN according to claim 80, wherein the first, second and third transceivers operate using a common protocol.

96. The wireless LAN according to claim 95, wherein the first transceiver operates using a first frequency channel and the second and third transceivers operate using a second frequency channel different than the first frequency channel.

97. The wireless LAN according to claim 95, wherein the first, second and third transceivers operate using a common frequency channel.

98. The wireless LAN according to claim 80, wherein the first, second and third transceivers operate using a common frequency channel.

99. The wireless LAN according to claim 98, wherein the first transceiver operates using a first protocol and the second and third transceivers operate using a second protocol different than the first protocol.

100. The wireless LAN according to claim 80, wherein the first transceiver operates using a first protocol and the second and third transceivers operate using a second protocol different than the first protocol.

101. The wireless LAN according to claim 80, wherein the packet hopping protocol includes a self-discovery feature used to identify devices within the wireless LAN.

102. The wireless LAN according to claim 80, wherein the packet hopping protocol includes a self-healing feature to reroute data packets throughout the wireless LAN based on network conditions.

103. The wireless LAN according to claim 80, further comprising a plurality of packet hopping access terminals and wherein the packet hopping protocol includes a self-configuring feature used to establish data pathways among the plurality of packet hopping access terminals and the packet hopping gateway, the data pathways being dynamically updated based on network conditions.

104. The wireless LAN according to claim 80, wherein the first transceiver and the second transceiver are implemented with common hardware.

105. The wireless LAN according to claim 80, wherein the first transceiver is implemented with a first interface assembly and the second transceiver is implemented with a second interface assembly.

106. A communications network; comprising:
a wide area network backbone;
a first wireless LAN according to claim 80, wherein the packet hopping gateway is coupled to the wide area network backbone via the network interface; and
the server coupled to the wide area network backbone via a firewall.

107. The communications network according to claim 106, further comprising an external network coupled to the wide area network backbone.

108. The communications network according to claim 106, further comprising a second wireless LAN, wherein a packet hopping gateway of the second wireless LAN is coupled to the wide area network backbone via a network interface of the packet hopping gateway of the second wireless LAN.

109. The communications network according to claim 108, wherein the server and the firewall comprise a first private LAN and the communications network further comprises a second private LAN having a second server coupled to the wide area network backbone via a second firewall.

110. The communications network according to claim 109, wherein the first wireless LAN and the first private LAN are configured to exchange data, the second wireless LAN and the second private LAN are configured to exchange data, the first wireless LAN is logically isolated from the second private LAN and the second wireless LAN is logically isolated from the first private LAN.

111. The communications network according to claim 108, wherein the packet hopping gateways of the first and the second wireless LANs are coupled to the wide area network backbone via a multiplexing device.

112. The communications network according to claim 106, further comprising a second packet hopping access terminal, the second packet hopping access terminal including a fourth transceiver for wirelessly receiving the data packets addressed to the first client device; for wirelessly transmitting the data packets addressed to the first client device to the first packet hopping access terminal in accordance with the packet hopping protocol; for wirelessly receiving the data packets from the first client device and transmitted by the first packet hopping access terminal; and for wirelessly transmitting the data packets from the first client device to the packet hopping gateway in accordance with the packet hopping protocol.

113. The communications network according to claim 112, wherein the second packet hopping access terminal further includes a fifth transceiver for wirelessly transmitting data packets addressed to a second client device and for wirelessly receiving data packets from the second client device and wherein the fourth transceiver wirelessly receives the data packets addressed to the second client device and wirelessly transmits the data packets from the second client device to the packet hopping gateway in accordance with the packet hopping protocol.

114. The communications network according to claim 106, wherein the packet hopping gateway further includes a local transceiver for wirelessly transmitting data packets addressed to another client device and for wirelessly receiving data packets from the another client device.

115. The communications network according to claim 106, wherein the packet hopping gateway carries out network management functions, the network management functions comprised of one or more functions selected from dynamic assignment of addresses to a plurality of client devices as each client device initiates communication with the wireless LAN, maintenance of a database of wireless LAN devices by logical name, a directory service, and combinations thereof.

116. The communications network according to claim 106, wherein the packet hopping gateway includes a security function for dynamically configuring a virtual private network between a firewall and each of a plurality of client devices as each client device initiates communication with the wireless LAN, the firewall disposed between the wide area network backbone and the server.

117. The communications network according to claim 106, wherein the packet hopping protocol includes features comprised of one or more functions selected from a self-discovery feature used to identify devices within the wireless LAN, a self-healing feature to reroute data packets throughout the wireless LAN based on network conditions, a self-configuring feature used to establish data pathways among additional packet hopping access terminals and the packet hopping gateway where the data pathways being dynamically updated based on network conditions, and combinations thereof.

118. The wireless LAN according to claim 80, wherein plural packet hopping access terminals (PHASTs) and the packet hopping gateway (PHG) establish a backbone network infrastructure having data pathways among the second transceivers of the PHASTs and the PHG third transceiver to thereby define a wireless packet hopping LAN for the intermediate transmission of:
 data packets sent by the client device and received by a first transceiver of one of the PHASTs for delivery to the server, and
 data packets sent by the server for delivery to the client.

119. The wireless LAN according to claim 118, wherein the client device is excluded from the wireless packet hopping LAN established by the PHASTs and PHG.

120. The wireless LAN according to claim 118, wherein the client device communicates directly with the first transceiver of a PHAST disposed within a communications proximity of the client.

121. The wireless LAN according to claim 118, wherein the first transceiver of each PHAST establishes a localized wireless network with one or more client devices that are disposed within a communications proximity of the first transceiver of the PHAST.

122. The wireless LAN according to claim 121, wherein the localized wireless network operates with a protocol other than the packet hopping protocol.

123. A communications network; comprising:
 a wide area network backbone;
 a first wireless LAN comprising:
  a first packet hopping access terminal, including:
   a first transceiver for wirelessly transmitting data packets addressed to a first client device and for wirelessly receiving data packets from the first client device; and
   a second transceiver for wirelessly receiving the data packets addressed to the first client device and for wirelessly transmitting the data packets received from the first client device in accordance with a packet hopping protocol, the packet hopping protocol including a data packet router/repeater function;
  a packet hopping gateway, including:
   a third transceiver for wirelessly receiving the data packets transmitted by the first packet hopping access terminal and for wirelessly transmitting the data packets addressed to the first client device in accordance with the packet hopping protocol; and
   a network interface for establishing communication with a server;
  wherein the packet hopping gateway is coupled to the wide area network backbone via the network interface, the server is coupled to the wide area network backbone via a firewall;
 a second wireless LAN, wherein a packet hopping gateway of the second wireless LAN is coupled to the wide area network backbone via a network interface of the packet hopping gateway of the second wireless LAN; and
 wherein the server and the firewall comprise a first private LAN and the communications network further comprises a second private LAN having a second server coupled to the wide area network backbone via a second firewall.

124. The communications network according to claim 123, wherein the first wireless LAN and the first private LAN are configured to exchange data, the second wireless LAN and the second private LAN are configured to exchange data, the first wireless LAN is logically isolated from the second private LAN and the second wireless LAN is logically isolated from the first private LAN.

125. A communications network; comprising:
 a wide area network backbone;
 a first wireless LAN comprising:
  a first packet hopping access terminal, including:
   a first transceiver for wirelessly transmitting data packets addressed to a first client device and for wirelessly receiving data packets from the first client device; and
   a second transceiver for wirelessly receiving the data packets addressed to the first client device and for wirelessly transmitting the data packets received from the first client device in accordance with a packet hopping protocol, the packet hopping protocol including a data packet router/repeater function;

a packet hopping gateway, including:
   a third transceiver for wirelessly receiving the data packets transmitted by the first packet hopping access terminal and for wirelessly transmitting the data packets addressed to the first client device in accordance with the packet hopping protocol; and
   a network interface for establishing communication with a server;
wherein the packet hopping gateway is coupled to the wide area network backbone via the network interface, the server is coupled to the wide area network backbone via a firewall, the packet hopping gateway includes a security function for dynamically configuring a virtual private network between a firewall and each of a plurality of client devices as each client device initiates communication with the wireless LAN, and the firewall is disposed between the wide area network backbone and the server.

126. A wireless local area network (LAN) for data communications, comprising:
a first packet hopping access terminal, including:
   a first transceiver for wirelessly transmitting data packets addressed to a first client device and for wirelessly receiving data packets from the first client device; and
   a second transceiver for wirelessly receiving the data packets addressed to the first client device and for wirelessly transmitting the data packets received from the first client device in accordance with a packet hopping protocol, the packet hopping protocol including a data packet router/repeater function; and a packet hopping gateway, including:
   a third transceiver for wirelessly receiving the data packets transmitted by the first packet hopping access terminal and for wirelessly transmitting the data packets addressed to the first client device in accordance with the packet hopping protocol; and
   a network interface for establishing communication with a server; and
wherein plural packet hopping access terminals (PHASTs) and the packet hopping gateway (PHG) establish a backbone network infrastructure having data pathways among the second transceivers of the PHASTs and the PHG third transceiver to thereby define a wireless packet hopping LAIN for the intermediate transmission of:
   data packets sent by the client device and received by a first transceiver of one of the PHASTs for delivery to the server, and
   data packets sent by the server for delivery to the client; and
wherein the first transceiver of each PHAST establishes a localized wireless network with one or more client devices that are disposed within a communications proximity of the first transceiver of the PHAST, and the localized wireless network operates with a protocol other than the packet hopping protocol.

* * * * *